United States Patent [19]
McClean

[11] 4,150,609
[45] Apr. 24, 1979

[54] COOKING APPARATUS
[75] Inventor: John W. McClean, Lakemba, Australia
[73] Assignee: Breville Holdings Pty. Ltd., Pyrmont, Australia
[21] Appl. No.: 894,118
[22] Filed: Apr. 6, 1978
[30] Foreign Application Priority Data
Aug. 9, 1977 [AU] Australia .............................. 1166/77
[51] Int. Cl.² ............................................. A47J 37/10
[52] U.S. Cl. ......................................... 99/372; 99/449
[58] Field of Search ........................ 99/372, 374–376, 99/377, 331, 380, 449, 428; 126/9 R, 9 B, 11; 219/524, 525, 530

[56] References Cited
U.S. PATENT DOCUMENTS

| 2,644,880 | 7/1953 | Valentini et al. | 219/525 |
| 3,348,470 | 10/1967 | Swanson | 99/331 |
| 3,880,064 | 4/1975 | Martinez | 99/372 |

Primary Examiner—Leonard D. Christian

[57] ABSTRACT

A small cooking apparatus intended for domestic use in the grilling of steaks, hamburgers and other foodstuffs consisting of a base and a cover which are hingedly connected there being mounted in each an electric heating element embedded in a block of metal such as aluminium adapted to constitute a heat sink. Associated with which is a removable cooking plate of light washable construction which is maintained in intimate contact with the heat sink so as to ensure maximum transfer of heat. The light construction of the cooking plate and the fact that they do not incorporate heating elements facilitates washing of the plates. The plates are preferably provided with insulated handles and the cover is preferably mounted so as to be capable of tilting about its mid line to accommodate foodstuffs of different thickness.

4 Claims, 4 Drawing Figures

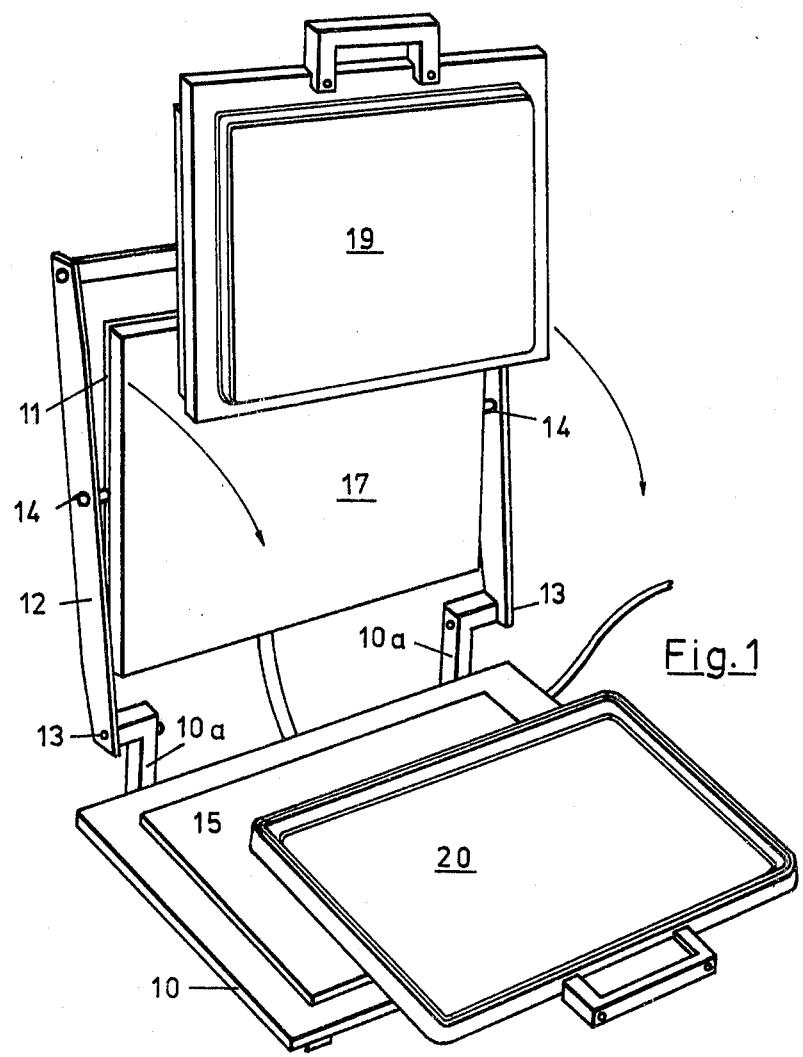
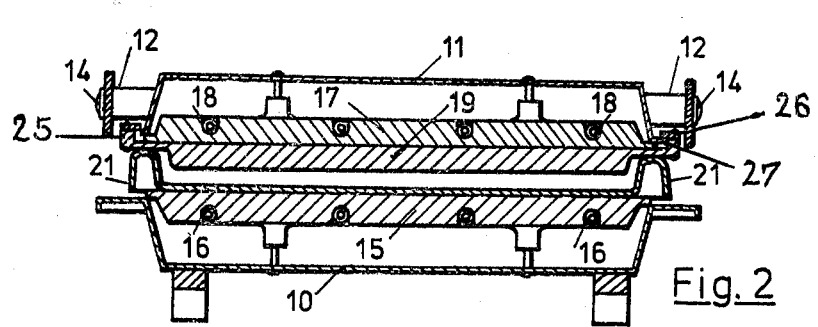

COOKING APPARATUS

The present invention relates to cooking appliances and more particularly to small cooking appliances intended for domestic use in the grilling of steaks, hamburgers and other foodstuffs.

Cooking appliances of the kind with which the present invention is concerned normally consist of a pair of plates suitably mounted which can be brought together in a substantially parallel relationship with the food to be cooked between them, the plates being heated by electric heating elements usually external to the plates.

In order to cook foodstuffs such as steaks successfully it is necessary to apply to the exterior of the steak a temperature sufficiently high to sear the surface of the steak and thus seal liquid contained in the steak within it to prevent loss during cooking. In order to achieve this it is necessary to ensure that there is a sufficient reservoir of heat available in the cooking plates after they have been brought to cooking temperature by means of the electric heating elements to ensure that the exterior of the steak is adequately seared. If insufficient heat is available, the temperature of the plate will drop quickly below the temperature necessary to sear the surface of the steak.

In order to ensure the availability of a sufficient reservoir of heat it is necessary to make the plates of a rather heavy construction and cooking appliances constructed on these lines are available and can be used successfully for the cooking of steaks. In the use of such appliances however there is a considerable problem involved in cleaning the appliance after use. This difficulty has been realised and in order to meet it a variety of appliances have been offered in which the plates are of relatively light construction and removable from the main body of the appliance so that they can be easily washed. In such appliances however the construction of the plates is such that an adequate reservoir of heat is not available for searing of the surfaces of steaks with the result that the cooking of steaks with these appliances leaves much to be desired.

The present invention provides a solution to this problem by providing a cooking appliance of the kind referred to in which the appliance consists of a base and a cover, hingedly connected to the base, each having mounted in it an electric heating element, the heating element being embedded in a block of metal adapted to constitute a heat sink and having one face presenting a relatively large area, there being associated with each heat sink a removable cooking plate of light washable construction also having a relatively large area on one face, means being provided wherein each cooking plate is attached to the base or hinged cover respectively with the said area being in intimate contact with the corresponding area of the adjacent heat sink whereby there is an effective transfer of heat from the heating element to the cooking plate.

The cooking plates may take a variety of different forms each of which is particularly suited to the cooking of a specific form of food such as a steak, hamburger or sandwich.

In order that the nature of the invention may be better understood a preferred form thereof is hereinafter described by way of example with reference to the accompanying drawings in which:

FIG. 1 is a perspective view of a cooking appliance according to the invention in an open position.

FIG. 2 is a transverse corss-sectional view of the apparatus shown in FIG. 1 on line II—II of FIG. 4 when in a closed position.

Figure 4:
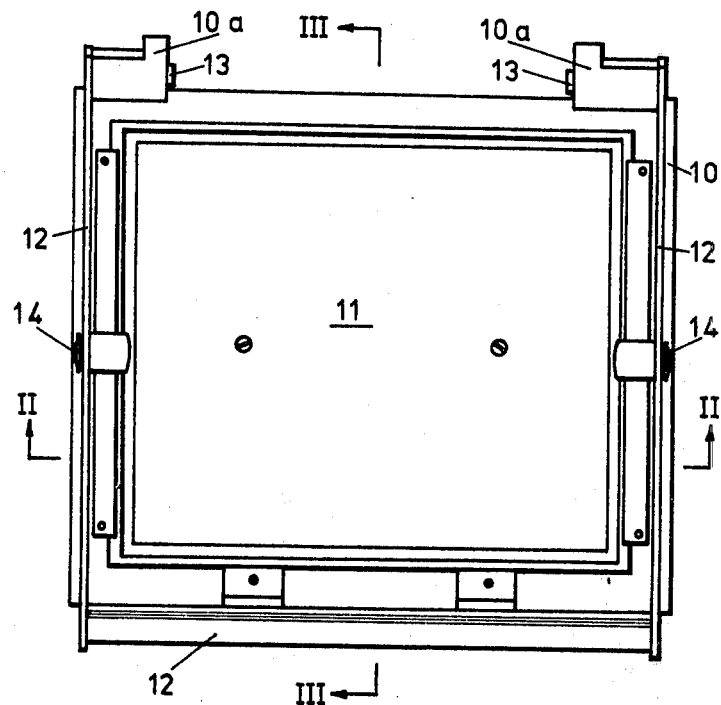
FIG. 4 is a plan view of the appliance in a closed position.

The apparatus shown in the drawings consists of a base indicated generally at 10 hingedly attached to which is a cover 11. The connection between the cover 11 and the base 10 is by means of the handle 12 which is pivotably mounted at points 13 to upward extensions 10a of the base 10. The cover itself is pivotably mounted in the handle at the points 14. The line joining the points 14 passes through the middle of the cover 11 which is thus free to tilt about its mid line; this feature enables the cover to adjust its position to some extent to take account of variations in the thickness of foodstuffs placed in the appliance.

Within the base 10 and secured to it by screws is a block of aluminium or other suitable heat conducting material 15 having embedded in it an electric heating element 16. The construction of the element 16 and the method by which it is embedded in the block 15 are conventional. A similar block 17 heated by the electric heating element 18 is mounted in the cover 11 and secured to it by screws. A pair of cooking plates 19 and 20 are provided, the configuration of which is such as to make them suitable for the grilling of steaks.

The plate 20 is made of relatively light sheet metal material and is thus easily washable. In order to give ridigity the plate is provided with a peripheral channel section portion 21. The underside of the area of the plate 20 enclosed by the peripheral channel section portion 21 is flat and makes intimate contact with the flat upper surface of the block 15, thus ensuring an effective transfer of heat from the block 15 to the plate 20. On one side the plate 20 is provided with a handle 22 of heat insulating material by means of which it may be lifted and removed from the appliance or replaced in it. Plate 20 is located in position by means of a locating member 23 which fits precisely within a rectangular area defined by the sides of the handle 22. Plate 20 thus may be readily removed by simply lifting handle 22 and withdrawing the plate. It may be replaced equally easily.

The plate 19 is also of relatively light easily washable construction and has a flat upper surface which is in intimate contact with the flat lower surface of the block 17. The plate 19 is provided with a heat insulating handle 24 similar to the handle 22 of plate 20. It is provided with a lateral flanges 25 each of which has attached to its upper surface a plate 26 which, when the plate 19 is in position, overlies a flange 27 of the cover 11. The plate 19 is thus held in position when the handle 12 of the appliance is raised. The plate 19 may either be readily removed by sliding it out in relation to the block 17 by means of the handle 24.

In the base or on the cover may be provided with conventional electrical control means such as an "on-off" switch, a thermostatic heat control and an indicator lamp. These are however not essential to the operation of the appliance.

Figure 3:
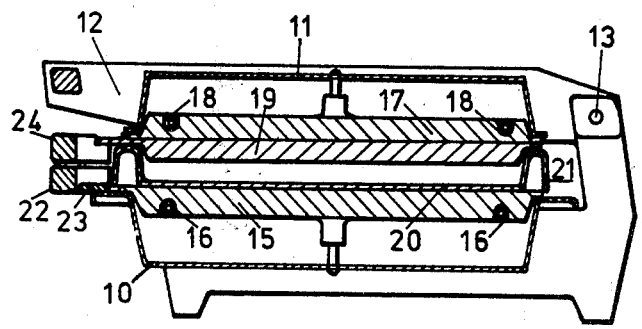
FIG. 3 is a cross-sectional view on line IV—IV of FIG. 2.

In use the appliance is connected to the main and switched on to bring the apparatus including the removable plates 19 and 20 up to cooking temperature. This is normally done with the apparatus closed in the configuration shown in FIGS. 2 and 3. When the required temperature is reached the appliance is opened and the steak or steaks to be grilled are placed on the plate 20. The plate 19 is then brought down on the plate 20 so that the steak or steaks is or are compressed slightly between them. By reason of the thermal storage capacity of mass of the blocks of aluminium 15 and 17 and, in addition, that of the plates 19 and 20 themselves, there is ample heat available to sear the surfaces of the steak or steaks and seal those surfaces during the initial stages of cooking. The cooking process is carried on as long as desired and thereafter the steak or steaks removed and the apparatus switched off. When it has cooled the cooking plates 19 and 20 may be readily removed and easily washed, in that they can be fully immersed in hot water containing a detergent and no special care has to be exercised in cleaning them as would be the case if they were associated with an electric heating element and its accompanying circuitry.

The precise form of the plates 19 and 20 may be varied considerably to provide for the cooking of different foodstuffs for example hamburgers, sandwiches or waffles. In each case however, the plates are shaped so as to make intimate contact over a substantial area with the blocks 15 and 17. The contact surfaces between the plates and the blocks are conveniently flat but need not be so provided that on one hand the plates can be easily removed for cleaning and replaced and on the other there is good contact between the plates and the blocks over a substantial area.

The particular form of the invention described above is given by way of example only to illustrate the underlying principle of the invention, namely the provision of substantial heat sinks in connection with the main part of the apparatus and the use of removable and readily washable cooking plates which during use are maintained in close contact with the heat sinks for optimum heat transfer. As will be readily appreciated by those skilled in the art this principle may be readily embodied in a variety of different forms of cooking appliance of the general kind with which the invention is concerned.

I claim:

1. A cooking appliance comprising a base, a cover hingedly connected to said base, electric heating elements respectively mounted in said base and cover, a block of metal embedding the respective heating element, adapted to constitute a heat sink, and having one face presenting a relatively large area, a removable cooking plate of washable construction associated with each heat sink and having a relatively large area on one face, means provided within each cooking plate for respectively attaching the same to the base and hinged cover, each said area of the cooking plate being in intimate contact with the corresponding area of the adjacent heat sink, whereby there is an effective transfer of heat from the respective heating element to the respective cooking plate.

2. A cooking appliance as claimed in claim 1, comprising a handle on each removable cooking plate, said handle being of heat insulating material, projecting laterally from an edge thereof, and by means of which it may be removed from the cooking appliance.

3. A cooking appliance as claimed in claim 1, comprising a pair of arms pivotably connected to the base, hingedly connecting said cover to said base, and extending on each side of the cover, the cover being hingedly connected on either side to said arms for pivoting about an axis passing approximately through its mid line, and means connecting the free ends of said pair of arms and serving as a handle.

4. A cooking appliance as claimed in claim 1, comprising means on opposite edges of the cover with which the cooking plate associated therewith is engaged so as to be removable by a sliding action in a direction parallel to said one face of the block of metal mounted in the cover.

* * * * *